United States Patent [19]
Lutter et al.

[11] Patent Number: 6,096,238
[45] Date of Patent: *Aug. 1, 2000

[54] PREPARATION OF CFC-FREE, HIGHLY RESILIENT, FLEXIBLE POLYURETHANE FOAMS, AND DIPHENYLMETHANE DIISOCYANATE-BASED POLYISOCYANATE MIXTURES MODIFIED BY MEANS OF URETHANE GROUPS WHICH CAN BE USED FOR THIS PURPOSE

[75] Inventors: Heinz-Dieter Lutter, Neckargemünd; Ruth Zschiesche, Mannheim; Jürgen Mertes, Altrip; Bernd Bruchmann, Ludwigshafen; Klaus Pittrich, Herrsching; Peter Brandt, Ludwigshafen, all of Germany

[73] Assignee: BASF Aktiengesellschaft, Ludwigshafen, Germany

[*] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 08/944,704

[22] Filed: Oct. 6, 1997

Related U.S. Application Data

[63] Continuation of application No. 08/413,673, Mar. 30, 1995, abandoned.

[30] Foreign Application Priority Data

Apr. 6, 1994 [DE] Germany .................... 4411781

[51] Int. Cl.$^7$ .................................................. C08G 18/48
[52] U.S. Cl. ..................... 252/182.22; 521/159; 528/77
[58] Field of Search ............ 252/182.22; 521/159; 528/77

[56] References Cited

U.S. PATENT DOCUMENTS

| | | | |
|---|---|---|---|
| 3,336,242 | 8/1967 | Hampson | 521/174 |
| 3,644,457 | 2/1972 | Konig | 560/351 |
| 4,055,548 | 10/1977 | Carleton | 528/59 |
| 4,229,347 | 10/1980 | Holt | 540/202 |
| 4,478,960 | 10/1984 | Buethe et al. | 521/160 |
| 5,374,667 | 12/1994 | Hinz et al. | 521/159 |

FOREIGN PATENT DOCUMENTS

| | | |
|---|---|---|
| 10 850 | 5/1980 | European Pat. Off. . |
| 22 617 | 1/1981 | European Pat. Off. . |
| 0 485 953 | 5/1992 | European Pat. Off. . |
| 0 555 742 | 8/1993 | European Pat. Off. . |
| 0 555 901 | 8/1993 | European Pat. Off. . |
| 0 557 792 | 9/1993 | European Pat. Off. . |
| 1064576 | 4/1967 | United Kingdom . |
| 1079105 | 8/1967 | United Kingdom . |
| 1369334 | 10/1974 | United Kingdom . |
| 1377679 | 12/1974 | United Kingdom . |
| 1430455 | 3/1976 | United Kingdom . |
| 1444192 | 7/1976 | United Kingdom . |
| 1450660 | 9/1976 | United Kingdom . |
| 1550325 | 8/1979 | United Kingdom . |

*Primary Examiner*—Rachel Gorr
*Attorney, Agent, or Firm*—Fernando A. Borrego

[57] ABSTRACT

The present invention relates to a process for the preparation of CFC-free, flexible polyurethane (molded) foams by reacting A) liquid polyisocyanate mixtures containing bonded urethane groups having a content of NCO groups of from 22 to 30% by weight which are themselves prepared by reacting a mixture of diphenylmethane diisocyanates and polyphenyl-polymethylene polyisocyanates having a content of diphenylmethane diisocyanate isomers of from 55 to 99% by weight, based on the total weight, with at least one trifunctional polyoxypropylene-polyol having a hydroxyl number of from 20 to 60, with B) relatively high-molecular-weight polyhydroxyl compounds and, if desired, C) low-molecular-weight chain extenders and/or crosslinking agents, in the presence of D) blowing agents, E) catalysts and, if desired, F) auxiliaries and/or additives, and to the polyisocyanate mixtures (A) modified by means of urethane groups which can be used according to the invention.

9 Claims, 1 Drawing Sheet

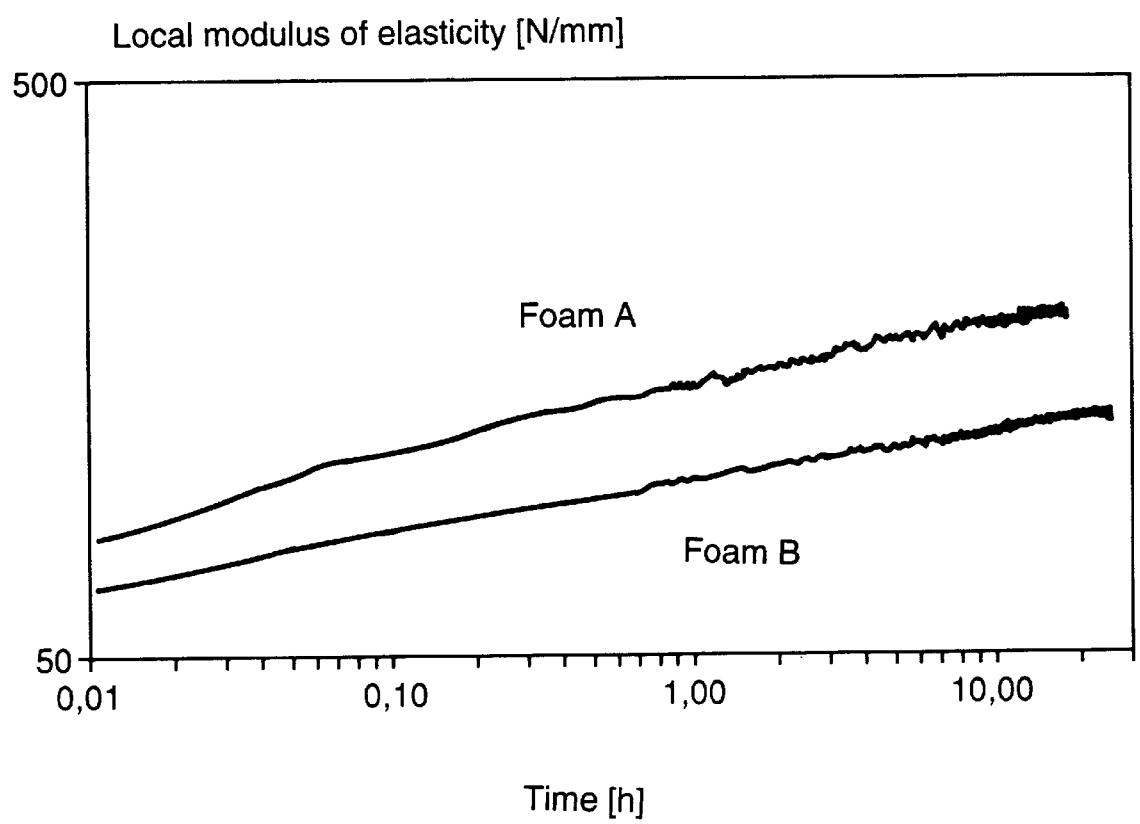

PREPARATION OF CFC-FREE, HIGHLY RESILIENT, FLEXIBLE POLYURETHANE FOAMS, AND DIPHENYLMETHANE DIISOCYANATE-BASED POLYISOCYANATE MIXTURES MODIFIED BY MEANS OF URETHANE GROUPS WHICH CAN BE USED FOR THIS PURPOSE

This is a continuation of application Ser. No. 08/413,673 filed Mar. 30, 1995, now abandoned.

The present invention relates to a process for the preparation of chlorofluorocarbon-(CFC-)free, highly resilient, flexible polyurethane (PU) foams and flexible molded foams by reacting starting materials which are known per se, but using specific, liquid, diphenylmethane diisocyanate (MDI)-based polyisocyanate mixtures which have been modified by means of urethane groups and which have an isocyanate content of from 22 to 30% by weight and which are themselves prepared by reacting a mixture of diphenylmethane diisocyanates and polyphenyl-polymethylene polyisocyanates having a content of diphenylmethane diisocyanate isomers of from 55 to 99% by weight, based on the total weight, with at least one trifunctional polyoxypropylene-polyol having a hydroxyl number of from 20 to 60, and to these liquid polyisocyanate mixtures containing bonded urethane groups.

The preparation of resilient, flexible PU molded foams by reacting relatively high-molecular-weight polyhydroxyl compounds, preferably polyester-polyols or polyether-polyols, and, if desired, chain extenders and/or crosslinking agents with organic and/or modified organic polyisocyanates is known and is described in numerous patents and other references.

Reference may be made by way of example to the Kunststoff-Handbuch, Volume VII, Polyurethanes, Carl Hanser Verlag, Munich, 1st Edition, 1966, edited by Dr. R. Vieweg and Dr. A Höchtlen, and 2nd Edition, 1983, edited by Dr. G. Oertel.

The suitable choice of the formative components and their mixing ratios allows the preparation of flexible PU foams having very good mechanical properties, in particular high tear strength and compressive strength.

1. BACKGROUND OF THE INVENTION

According to DE-C-1520737 (U.S. Pat. No. 3,336,242), PU foams having an open cell structure can be prepared by a one-step process by reacting polyisocyanates with polyoxypropylene-polyoxyethylene-triols having molecular weights of from 3000 to 8000 which contain, in bonded form, from 3 to 5% by weight of ethylene oxide as terminal block and glycerol as initiator molecule.

According to GB-A-1,079,105, very flexible PU foams are obtained from a polyether-polyol or a mixture thereof having a hydroxyl number of from 70 to 170 which contains a trifunctional polyoxyalkylene-polyol, for example propoxylated glycerol, and up to 40% by weight of a polyoxyalkylene glycol, for example propoxylated ethylene glycol, and an organic polyisocyanate, preferably tolylene diisocyante (TDI), in the presence of water and a chlorofluorocarbon, preferably trichlorofluoromethane, as blowing agent.

Flexible PU foams are furthermore described in GB-A-1,064,576, according to which organic diisocyanates, preferably TDI, are reacted with a mixture of from 50 to 90% by weight of a polyoxyalkylene-triol having a hydroxyl number of from 30 to 170 and from 10 to 50% by weight of a polyoxyalkylene-diol having a hydroxyl number of from 40 to 110, the mixture having a content of primary hydroxyl groups of from 10 to 65%, in the presence of water.

Also known is the preparation of diphenylmethane diisocyanate compositions which are liquid at room temperature. According to DE-C-16 18 380 (U.S. Pat. No. 3,644,457), these are prepared by reacting one mole of 4,4'- and/or 2,4'-MDI with from 0.1 to 0.3 mol of tri-1,2-oxypropylene glycol and/or poly-1,2-oxypropylene glycol having a molecular weight of up to 700.

According to GB-A-1,369,334, the modification is carried out in two reaction steps, the modifier used being dipropylene glycol or polyoxypropylene glycol having a molecular weight of below 2000.

DE-A-29 13 126 (U.S. Pat. No. 4,229,347) describes MDI compositions in which from 10 to 35% by weight of the isocyanate groups have been reacted with a mixture of at least 3 alkylene glycols, one of these glycols being dipropylene glycol, tripropylene glycol or a higher-molecular-weight polypropylene glycol.

By contrast, the modifier used in DE-A-24 04 166 (GB-A-1,430,455) is a mixture of a polyoxyethylene glycol or polyoxyethylene glycol mixture having a mean molecular weight of less than 650 and at least one alkylene glycol containing at least 3 carbon atoms.

DE-A-23 46 996 (GB-A-1,377,673) relates to MDI compositions in which from 10 to 35% by weight of the isocyanate groups have been reacted with a commercially available polyoxyethylene glycol.

It has also been disclosed that liquid polyisocyanate compositions can be prepared using a mixture of MDI and polyphenyl-polymethylene polyisocyanates (crude MDI) in addition to MDI and glycols and/or polyoxyalkylene glycols.

According to EP-A-10 850, a polyisocyanate composition of this type comprises MDI which has been modified by means of polyoxyalkylene-polyols having a functionality of from 2 to 3 based on polyoxypropylene-polyol and, if desired, polyoxyethylene-polyol having molecular weights of from 750 to 3000, mixed with crude MDI.

According to DE-B-27 37 338 (U.S. Pat. No. 4,055,548), a liquid, crude MDI composition is obtained by combining crude MDI with a polyoxyethylene glycol having a mean molecular weight of from 200 to 600.

According to DE-B-26 24 526 (GB-A-1,550,325), a crude MDI prepared by a special process and containing from 88 to 95% by weight of MDI is reacted with polyoxypropylene glycol having a molecular weight in the range from 134 to 700.

DE-A-25 13 796 (GB-A-1,444,192) and DE-A-25 13 793 (GB-A-1,450,660) relate to crude MDI compositions in which the crude MDI has been modified by means of alkylene glycols or polyoxyalkylene glycols in certain amounts.

Although said alkylene glycols or polyoxyalkylene glycols cause liquefaction of the 4,4'- or 2,4'-MDI isomers, which melt at 42° C. and 28° C. respectively, it is disadvantageous that the polyisocyanate compositions exhibit crystalline deposits after extended storage at temperatures around 10° C.

It is furthermore known to prepare flexible PU foams using crude MDI compositions which have been modified by means of urethane groups as the polyisocyanate component.

According to EP-A-22 617, this preparation process is carried out by reacting a difunctional to trifunctional polyoxypropylene-polyoxyethylene-polyol having a content of polymerized oxyethylene groups of at least 50% by weight with a mixture of MDI isomers, and subsequently diluting the resultant quasi-prepolymer with crude MDI. A particular disadvantage of the PU foams described is their low tensile strength and tear propagation strength.

Polyisocyanate mixtures based on crude MDI which have been modified by means of urethane groups and which have a content of NCO groups of from 12 to 30% by weight are also described in EP-B-0 111 121 (U.S. Pat. No. 4,478,960). The MDI or crude MDI is modified using a polyoxypropylene-polyoxyethylene-polyol having a functionality of from 2 to 4, a hydroxyl number of from 10 to 65 and a content of polymerized ethylene oxide units of from 5 to 30% by weight. These polyisocyanate mixtures which have been modified by means of urethane groups can be used to prepare PU foams having increased elongation at break and improved tensile strength and tear propagation strength. The only disadvantage of these PU foams is that chlorofluorocarbons must be used as blowing agents for their preparation.

Prepolymers containing isocyanate groups, prepared from polyisocyanate mixtures containing 4,4'-MDI and polyoxyalkylene-polyols having a mean functionality of from 2 to 4, a hydroxyl equivalent weight of from 2200 to 3500 and a content of oxyethylene units of from 40 to 68% by weight are, according to EP-A-0 485 953, used for the preparation of flexible PU foams having improved elongation at break.

EP-A-0 555 742 describes a process for the preparation of CFC-free, flexible PU foams using a liquid polyisocyanate mixture containing bonded urethane groups and having a content of NCO groups of from 20 to 30% by weight, which is itself prepared by reacting crude MDI with a polyether-polyol mixture having a hydroxyl number of from 25 to 120 which comprises at least one polyoxypropylene glycol and at least one trifunctional polyoxypropylene-polyoxyethylene-polyol having a content of ethylene oxide units of from 90 to 10% by weight. The flexible PU (molded) foams prepared using these polyisocyanate mixtures which have been modified by means of urethane groups have good mechanical properties, it being possible, depending on the manner in which the polyisocyanate mixtures containing urethane groups have been prepared, for foamable reaction mixtures having better flow properties or flexible PU foams having low tensile strength and elongation, but improved compression set and compressive strength to be obtained.

According to EP-A-0 557 792, flexible, resilient, CFC-free PU (molded) foams of low density can be prepared by reacting starting materials known per se, but using a liquid, MDI-based polyisocyanate mixture which has been modified by means of urethane groups and which has an isocyanate content of from 22 to 30% by weight, which is itself prepared by reacting crude MDI with at least one polyoxypropylene-polyoxyethylene-polyol having a functionality of from 2.5 to 3.5, a hydroxyl number of from 50 to 90 and a content of polymerized ethylene oxide groups of greater than 30 to less than 50% by weight based on the weight of the alkylene oxide groups.

This type of polyisocyanate mixtures containing urethane groups is highly compatible with other formative components for the preparation of flexible PU foams and is readily miscible with polar or nonpolar blowing agents, in particular water and/or carboxylic acids. Said MDI-based polyisocyanate mixtures containing urethane groups and modified by means of polyether-polyols or polyether-polyol mixtures with different structures are suitable for the targeted improvement of at least one specific mechanical property of the flexible PU (molded) foam prepared. However, these publications contain no mention of an increase in resilience or an improvement in the sitting comfort of the flexible PU (molded) foam.

Liquid, pale-colored, MDI-based polyisocyanate mixtures and their use in the preparation of pale-colored, tough and rigid PU foams are described in EP-A-0 550 901.

The prepolymer is prepared using crude MDI containing a proportion of from 75 to 95% by weight of MDI isomers, where the proportion of 2,4'-MDI is from 15 to 40% by weight and the proportion of 2,2'-MDI is from 2 to 10% by weight, and from 5 to 25% by weight of polymeric isocyanates from the MDI series and polyether-polyols having a functionality of from 3 to 8 and a hydroxyl number of from 350 to 1000 mg of KOH/g.

It was hitherto only possible to prepare flexible PU (molded) foams of high sitting comfort using 2,4- and 2,6-tolylene diisocyanate (TDI) isomer mixtures.

2. SUMMARY

It is an object of the present invention to prepare, starting from MDI-containing polyisocyanate mixtures, flexible PU foams, preferably flexible PU molded foams, which, on the one hand, are highly resilient and, on the other hand, have very high sitting comfort comparable to that of flexible PU foams made from TDI. The flexible PU (molded) foams should find application, in particular, as cushioning materials, preferably in the automobile sector.

We have found that, surprisingly, this object is achieved by carrying out the preparation of the flexible PU foam using an MDI-based polyisocyanate mixture which has been modified by means of urethane groups as the polyisocyanate component and water as the particularly preferred blowing agent.

The present invention accordingly provides a process for the preparation of CFC-free, highly resilient, flexible PU foams and molded foams by reacting A) liquid, diphenylmethane diisocyanate-based polyisocyanate mixtures containing bonded urethane groups with B) relatively high-molecular-weight polyhydroxyl compounds and C) if desired, low-molecular-weight chain extenders and/or crosslinking agents, in the presence of D) blowing agents, E) catalysts and, if desired, F) additives, wherein the liquid polyisocyanate mixtures (A) containing bonded urethane groups have a content of NCO groups of from 22 to 30% by weight, based on the total weight, and are obtained by reacting a) a mixture (a) of diphenylmethane diisocyanates and polyphenyl-polymethylene polyisocyanates having a content of diphenylmethane diisocyanate (MDI) isomers of from 55 to 99% by weight, based on the total weight of the mixture, with b) at least one trifunctional polyoxypropylene polyol (b) having a hydroxyl number of from 20 to 60.

The present invention furthermore provides the liquid, diphenyl-methane diisocyanate-based polyisocyanate mixtures which have been modified by means of urethane groups and have a content of NCO groups of from 22 to 30% by weight which can be used in the novel process for the preparation of the CFC-free, flexible PU (molded) foams, these mixtures being obtainable by reacting a) a mixture (a) of diphenylmethane diisocyanates and polyphenyl-polymethylene polyisocyanates having a content of diphenylmethane diisocyanate (MDI) isomers of from 55 to 99% by weight, based on the total weight of the mixture (a), with b) at least one trifunctional polyoxypropylene polyol (b) having 10 a hydroxyl number of from 20 to 60.

The flexible PU (molded) foams prepared by the novel process using the specific polyisocyanate mixtures (A) modified by means of urethane groups are highly resilient and have very high sitting comfort comparable to that of flexible PU foams based on TDI, expressed through the high rebound resilience and measured with the aid of the ball rebound test as described in ASTM D 3574-86. They are furthermore distinguished by a large proportion of open cells and high green strength. It is also advantageous that the foamable reaction mixtures can readily be processed in various types of foaming equipment owing to the good compatibility of the novel liquid polyisocyanate mixture (A) containing bonded urethane groups with the other formative components. The foamable reaction mixtures have very good flow properties.

3. BRIEF DESCRIPTION OF THE DRAWING

FIG. 1 illustrates the local modulus of elasticity for a conventional flexible molded foam (A) and a flexible TU molded foam (B) prepared according to the invention.

4. DETAILED DESCRIPTION OF THE INVENTION

The following details apply to the preparation of the novel, liquid, MDI-based polyisocyanate mixtures (A) containing bonded urethane groups and to the other formative components (B) to (F) which can be used in the novel process for the preparation of the CFC-free, flexible PU (molded) foams:

The liquid polyisocyanate mixtures (A) containing bonded urethane groups and having a content of NCO groups of from 22 to 30% by weight, preferably from 24 to 30% by weight, in particular from 26 to 29% by weight, are advantageously prepared using the following MDI-containing polyisocyanate mixtures:

Suitable mixtures (a) of diphenylmethane diisocyanates and polyphenyl-polymethylene polyisocyanates, usually known as crude MDI, contain from 55 to 99% by weight, preferably from 67 to 98% by weight, of MDI isomers in addition to higher homologs. Highly successful mixtures (a) of crude MDI have proven to be those which contain or preferably comprise, based on the total weight of the mixture (a), where the percentages by weight of (a1) to (a4) add up to 100% by weight, a1) from 45 to 65% by weight, preferably from 47 to 60% by weight, of 4,4'-MDI, a2) from 10 to 50% by weight, preferably from 15 to 45% by weight, of 2,4'-MDI, a3) from 0 to 1% by weight, preferably from 0.1 to 0.4% by weight, of 2,2'-MDI and a4) from 45 to 1% by weight, preferably from 33 to 2% by weight, in particular from 28 to 7% by weight, of at least trifunctional polyphenyl-polymethylene polyisocyanates.

The novel, liquid polyisocyanate mixtures (A) containing urethane groups are preferably prepared using polyisocyanate mixtures (a) of MDI isomers and polyphenyl-polymethylene polyisocyanates (crude MDI) which, owing to the chosen starting materials and reaction conditions for their preparation, already have an MDI isomer content of from 55 to 99% by weight, preferably from 67 to 98% by weight, based on the total weight of the mixture (a), particular preference being given to crude MDI having a 4,4'-MDI content of from 45 to 65% by weight, preferably from 47 to 60% by weight, and a 2,4'-MDI content of from 10 to 50% by weight, preferably from 15 to 45% by weight, based on the total weight of the mixture (a).

If crude MDI of this type is not available, but instead, for example, only that having a higher content of at least trifunctional polyphenyl-polymethylene polyisocyanates, the latter can be mixed with mixtures of MDI isomers or 4,4'-MDI and/or 2,4'-MDI in the requisite amounts. Mixtures of MDI isomers which are suitable for this purpose expediently contain or preferably comprise, based on the total weight of the MDI isomer mixture, from 90 to 48% by weight, preferably from 77.5 to 50% by weight, of 4,4'-MDI, from 10 to 48% by weight, preferably from 20 to 50% by weight, of 2,4'-MDI and from 0 to 4% by weight, preferably from 0 to 2.5% by weight, of 2,2'-MDI.

In an analogous manner, it is also possible to blend mixtures of MDI isomers with at least trifunctional polyphenyl-polymethylene polyisocyanates and/or crude MDI having a relatively high content, for example greater than 45% by weight, preferably from 45 to 65% by weight, of at least trifunctional polyphenyl-polymethylene polyisocyanates in order to obtain suitable mixtures (a).

The trifunctional polyoxypropylene-polyols (b) which can be used according to the invention as modifiers have a hydroxyl number of from 20 to 60, preferably from 26 to 44. They can be prepared, for example, by propoxylation of an initiator molecule mixture having a mean functionality of 3 or preferably of triols in the presence of basic catalyts. Suitable initiator molecule mixtures having a functionality of 3 can comprise, for example, tetrafunctional alcohols and alkanediols, dialkylene glycols and/or water.

Examples of suitable triols are cycloaliphatic triols, for example cyclohexane triol isomer mixtures, or preferably aliphatic triols, for example trimethylolpropane and in particular glycerol, and mixtures of trimethylolpropane and glycerol.

Examples of customary basic catalysts are alkali metal alkoxides having 1 to 4 carbon atoms in the alkyl radical, such as sodium methoxide, sodium ethoxide, potassium ethoxide, potassium isopropoxide and sodium butoxide, alkaline earth metal hydroxides, for example calcium hydroxide, and preferably alkali metal hydroxides, in particular sodium hydroxide and potassium hydroxide.

The trifunctional polyoxypropylene-polyols (b) having a hydroxyl number of from 20 to 60 which are suitable according to the invention and which are preferably employed alone for the formation of the novel polyisocyanate mixtures containing urethane groups can be replaced, for example in order to modify the mechanical properties of the flexible PU (molded) foams, by mixtures of the trifunctional polyoxypropylene-polyols (b) which are suitable according to the invention and trifunctional polyoxypropylene-polyoxyethylene-polyols (b1) having a hydroxyl number of from 20 to 60, preferably from 26 to 44, and a content of polymerized ethylene oxide units of from 10 to 90% by weight, preferably from 70 to 88% by weight, based on the total weight of the alkylene oxide units. In this case, the polymerized 1,2-propylene oxide and ethylene oxide groups can be randomly distributed or in the form of blocks within the chain or at the ends of the chain. Depending on the content of ethylene oxide units and their position in the polyoxypropylene-polyoxyethylene-polyol, the reactivity of the latter and its miscibility with the crude MDI and the polar and nonpolar blowing agents in the reaction mixture can be customized to the particular requirements.

Any such polyether-polyol mixtures used to modify the crude MDI are expediently those which contain or preferably comprise, based on the total weight, b) from 80 to 20% by weight, preferably from 70 to 20% by weight, of at least one trifunctional polyoxypropylene-polyol (b) having a hydroxyl number of from 20 to 60 and b1) from 20 to 80% by weight, preferably from 30 to 80% by weight, of at least one trifunctional polyoxypropylene-polyoxyethylene-polyol (b1) having a hydroxyl number of from 20 to 60 and an ethylene oxide content of from 10 to 90% by weight, based on the total weight of the polymerized alkylene oxide units.

The liquid polyisocyanate mixtures (A) containing bonded urethane groups and having a content of NCO groups of from 22 to 30% by weight, based on the total weight, which can be used according to the invention can be obtained by reacting, based on the total weight, a) from 76 to 95.5% by weight, preferably from 79 to 94% by weight, of a mixture which itself comprises, based on the total weight of the mixture (a), a1) from 45 to 65% by weight, preferably from 47 to 60% by weight, of 4,4'-MDI, a2) from 10 to 50% by weight, preferably from 15 to 45% by weight, of 2,4'-MDI, a3) from 0 to 1% by weight, preferably from 0.1 to 0.4% by weight, of 2,2'-MDI and a4) from 45 to 1% by weight, preferably from 33 to 2% by weight, in particular from 28 to 7% by weight, of at least trifunctional polyphenyl-polymethylene polyisocyanate with b) from 24 to 4.5% by weight, preferably from 21 to 6% by weight, of at least one trifunctional polyoxypropylene-polyol (b) having a hydroxyl number of from 20 to 60 or a mixture of (b) and at least one trifunctional polyoxypropylene-polyoxyethylene-polyol (b1) having a hydroxyl number of from 20 to 60, for example at from 10 to 120° C., preferably at from 30 to 90° C., and, depending on the chosen reaction temperature, for a reaction time of, for example, from 0.5 to 6 hours, preferably from 1 to 3 hours. When the reaction is complete, the novel, liquid, MDI-based polyisocyanate mixtures (A) containing urethane groups are allowed to cool to room temperature. The products have a shelf life of at least 8 weeks at from −4 to 10° C.

For the preparation of the CFC-free, highly resilient, flexible PU (molded) foams, the liquid, MDI-based polyisocyanate mixtures (A) containing bonded urethane groups are, as stated above, foamed in open or closed molds together with conventional relatively high-molecular-weight polyhydroxyl compounds (B) and, if desired, low-molecular-weight chain extenders and/or crosslinking agents (C) in the presence of blowing agents (D), catalysts (E) and, if desired, additives (F).

The relatively high-molecular-weight polyhydroxyl compounds (B) used for this purpose are preferably conventional linear and/or branched polyester-polyols and in particular polyether-polyols having molecular weights of, for example, from 1800 to 8200, preferably from 2200 to 7000, in particular from 2800 to 6200. Also suitable, however, are polymer-modified polyether-polyols, polyether-polyol dispersions and other hydroxyl-containing polymers and polycondensation products having the above molecular weight, for example polyacetals, polyester amides and/or polycarbonates, in particular those prepared from diphenyl carbonate and 1,6-hexanediol by transesterification, or mixtures of at least two of said polyhydroxyl compounds.

Suitable polyester-polyols can be prepared, for example, from organic dicarboxylic acids having 2 to 12 carbon atoms, preferably aliphatic dicarboxylic acids having 4 to 6 carbon atoms, and polyhydric alcohols, preferably alkanediols, having 2 to 12 carbon atoms, preferably 2 to 6 carbon atoms, and/or dialkylene glycols. Examples of suitable dicarboxylic acids are: succinic acid, glutaric acid, adipic acid, suberic acid, azelaic acid, sebacic acid, decanedicarboxylic acid, maleic acid, fumaric acid, phthalic acid, isophthalic acid and terephthalic acid. The dicarboxylic acids can be used either individually or as mixtures with one another. The free dicarboxylic acids can also be replaced by the corresponding dicarboxylc acid derivatives, for example dicarboxylic esters of alcohols having 1 to 4 carbon atoms or dicarboxylic anhydrides. Preference is given to dicarboxylic acid mixtures of succinic acid, glutaric acid and adipic acid in mixing ratios of, for example, from 20 to 35 : from 35 to 50 : from 20 to 32 parts by weight, and in particular adipic acid. Examples of dihydric and polyhydric alcohols, in particular alkanediols and dialkylene glycols are: ethanediol, diethylene glycol, 1,2- and 1,3-propanediol, dipropylene glycol, 1,4-butanediol, 1,5-pentanediol, 1,6-hexanediol, 1,10-decanediol, glycerol and trimethylolpropane. Preference is given to ethanediol, diethylene glycol, 1,4-butanediol, 1,5-pentanediol, 1,6-hexanediol or mixtures of at least two of said alkanediols, in particular mixtures of 1,4-butanediol, 1,5-pentanediol and 1,6-hexanediol. It is furthermore possible to employ polyester-polyols made from lactones, for example ε-caprolactone or hydroxycarboxylic acids, for example ω-hydroxycaproic acid.

The polyester-polyols can be prepared by polycondensing the organic, for example aromatic, preferably aliphatic, polycarboxylic acids and/or derivatives thereof and polyhydric alcohols and/or dialkylene glycols in the absence or preferably in the presence of esterification catalysts, expediently in an inert-gas atmosphere, for example of nitrogen, helium, argon, inter alia, in the melt at from 150 to 250° C., preferably at from 180 to 220° C., under atmospheric pressure or under reduced pressure to the desired acid number, which is advantageously less than 10, preferably less than 2. In a preferred embodiment, the esterification mixture is polycondensed at the above temperatures to an acid number of from 80 to 30, preferably from 40 to 30, under atmospheric pressure and subsequently under a pressure of less than 500 mbar, preferably from 50 to 150 mbar. Examples of suitable esterification catalysts are those comprising iron, cadmium, cobalt, lead, zinc, antimony, magnesium, titanium or tin in the form of metals, metal oxides or metal salts. However, the polycondensation can also be carried out in the liquid phase in the presence of diluents and/or entrainers, for example benzene, toluene, xylene or chlorobenzene, for removal of the water of condensation by azeotropic distillation. Low-fogging polyester-polyols can be prepared by subjecting the resultant polyester-polyols to at least one additional distillation under reduced pressure, for example in a thin-film and/or falling film evaporator.

The polyester-polyols are prepared by polycondensing the organic polycarboxylic acids and/or derivatives thereof and polyhydric alcohols, advantageously in a molar ratio of from 1:1 to 1.8, preferably from 1:1.05 to 1.2.

The polyester-polyols obtained preferably have a functionality of from 2 to 4, in particular from 2 to 3, and a molecular weight of from 1800 to 3600, preferably from 2200 to 3200.

However, the polyhydroxyl compounds used are in particular polyether-polyols prepared by known processes, for example by anionic polymerization using alkali metal hydroxides, such as sodium hydroxide or potassium hydroxide, or alkali metal alkoxides, such as sodium methoxide, sodium ethoxide, potassium ethoxide or potassium isopropoxide, as catalysts and with the addition of at least one initiator molecule containing from 2 to 4, preferably 2 or 3, bonded reactive hydrogen atoms, or by cationic polymerization using Lewis acids, such as antimony pentachloride, boron fluoride etherate, inter alia, or bleaching earth as catalysts, from one or more alkylene oxides having from 2 to 4 carbon atoms in the alkylene radical.

Examples of suitable alkylene oxides are tetrahydrofuran, 1,3-propylene oxide, 1,2- and 2,3-butylene oxide, styrene oxide and preferably ethylene oxide and 1,2-propylene oxide. The alkylene oxides can be used individually, alternately one after the other or as mixtures. Examples of suitable initiator molecules are: water, organic dicarboxylic acids, such as succinic acid, adipic acid, phthalic acid and terephthalic acid, aliphatic and aromatic, unsubstituted or N-mono-, N,N- and N,N'-dialkyl-substituted diamines having 1 to 4 carbon atoms in the alkyl radical, such as unsubstituted, mono- and dialkyl-substituted ethylenediamine, diethylenetriamine, triethylenetetramine, 1,3-propylenediamine, 1,3- and 1,4-butylenediamine, 1,2-, 1,3-, 1,4-, 1,5- and 1,6-hexamethylenediamine, phenylenediamines, 2,3-, 2,4- and 2,6-tolylenediamine and 4,4'-, 2,4'- and 2,2'-diaminodiphenylmethane.

Other suitable initiator molecules are: alkanolamines, for example ethanolamine, N-methyl- and N-ethylethanolamine, dialkanolamines, for example diethanolamine, N-methyl- and N-ethyldiethanolamine, and trialkanolamines, for example triethanolamine, and ammonia. Preference is given to polyhydric, in particular dihydric and/or trihydric alcohols and dialkylene glycols, such as ethanediol, 1,2- and 1,3-propanediol, diethylene glycol, dipropylene glycol, 1,4-butanediol, 1,6-hexanediol, glycerol, trimethylolpropane and pentaerythritol.

The polyether-polyols, preferably polyoxypropylene- and polyoxypropylene-polyoxyethylene-polyols, have a functionality of from 2 to 4, preferably 2 to 3, and molecular weights of from 1800 to 8200, preferably from 2200 to 7000, in particular from 2800 to 35 6200, and suitable polyoxytetramethylene glycols having molecular weights of up to approximately 3600.

Other suitable polyether-polyols are polymer-modified polyetherpolyols, preferably graft polyether-polyols, in particular those based on styrene and/or acrylonitrile and prepared by in-situ polymerization of acrylonitrile, styrene or preferably mixtures of styrene and acrylonitrile, for example in a weight ratio of from 90:10 to 10:90, preferably from 70:30 to 30:70, expediently in the abovementioned polyether-polyols analogously to the information given in German Patents 11 11 394, 12 22 669 (U.S. Pat. Nos. 3,304,273, 3,383,351 and 3,523,093), 11 52 536 (GB 1,040, 452) and 11 52 537 (GB 987,618), and polyether-polyol dispersions containing, as disperse phase, usually in an amount of from 1 to 50% by weight, preferably from 2 to 25% by weight: for example polyureas, polyhydrazides, polyurethanes containing bonded tertiary amino groups, and/or melamine, and described, for example, in EP-B-011 752 (U.S. Pat. No. 4,304,708), U.S. Pat. No. 4,374,209 and DE-A-32 31 497.

Like the polyester-polyols, the polyether-polyols can be used individually or in the form of mixtures. They can furthermore be mixed with the graft polyether-polyols or polyester-polyols and the hydroxyl-containing polyester amides, polyacetals and/or polycarbonates. Examples of mixtures which have proven highly suitable are those having a functionality of from 2 to 3 and a molecular weight of from 1800 to 8200 which contain at least one polyether-polyol and at least one polymer-modified polyether-polyol from the group consisting of graft polyether-polyols or polyether-polyol dispersions containing, as disperse phase, polyureas, polyhydrazides, or polyurethanes containing bonded tertiary amino groups.

Examples of suitable hydroxyl-containing polyacetals are the compounds which can be prepared from glycols, such as diethylene glycol, triethylene glycol, 4,4'-dihydroxyethoxydiphenyldimethylmethane, hexanediol and formaldehyde. Suitable polyacetals can also be prepared by polymerization of cyclic acetals.

Suitable hydroxyl-containing polycarbonates are those of the type known per se, which can be prepared, for example, by reacting diols, for example 1,3-propanediol, 1,4-butanediol and/or 1,6-hexanediol, diethylene glycol, triethylene glycol or tetraethylene glycol, with diaryl carbonates, for example diphenyl carbonate, or phosgene.

The polyester amides include, for example, the predominantly linear condensates obtained from polybasic, saturated and/or unsaturated carboxylic acids or their anhydrides and polyhydric, saturated and/or unsaturated aminoalcohols, or mixtures of polyhydric alcohols and aminoalcohols and/or polyamines.

The CFC-free, flexible PU (molded) foams can be prepared in the presence or absence of difunctional chain extenders and/or at least trifunctional crosslinking agents (C). In order to modify the mechanical properties, for example the hardness, however, the addition of these chain extenders, crosslinking agents or possibly mixtures thereof may prove advantageous. Suitable chain extenders and/or crosslinking agents are polyfunctional, in particular difunctional and/or trifunctional compounds, having molecular weights of from 18 to approximately 400, preferably from 62 to approximately 300. Examples of compounds used are di- and/or trialkanolamines, for example diethanolamine and triethanolamine, alkylene glycols, for example diethylene glycol and dipropylene glycol, aliphatic diols and/or triols having 2 to 6 carbon atoms in the alkylene radical, for example ethanediol, 1,3-propanediol, 1,4-butanediol, 1,5-pentanediol, 1,6-hexanediol, glycerol and/or trimethylolpropane, and low-molecular-weight ethoxylation and/or propoxylation products prepared from the above dialkanolamines, trialkanolamines, diols and/or triols, and aliphatic and/or aromatic diamines, for example 1,2-ethanediamine, 1,4-butanediamine, 1,6-hexanediamine, 2,3-, 2,4- and/or 2,6-tolylenediamine, 4,4'-diaminodiphenylmethane, 3,3'-di- and/or 3,3',5,5'-tetraalkyl-substituted 4,4'-diaminodiphenylmethanes as initiator molecules and alkylene oxide or mixtures thereof.

Preferred chain extenders and/or crosslinking agents (C) are dialkanolamines, diols and/or triols and in particular diethanolamine, 1,6-hexanediol, 1,4-butanediol, trimethylolpropane and glycerol, or mixtures thereof.

The chain extenders and/or crosslinking agents (C) which are advantageously used for the preparation of the flexible PU (molded) foams are expediently used in such amounts by weight that from 0.01 to 8 mol, in particular from 0.1 to 3 mol, of chain extender and/or crosslinking agent (C) are present in the reaction mixture per mole of relatively high-molecular-weight polyhydroxyl compound (B).

The blowing agent (D) for the preparation of the flexible PU (molded) foams is in particular water, which reacts with isocyanate groups to form carbon dioxide. The amounts of water expediently employed are from 0.1 to 8 parts by weight, preferably from 2.5 to 6.0 parts by weight., in particular from 3.3 to 4.3 parts by weight, based on 100 parts by weight of the polyhydroxyl compounds (B).

Other suitable blowing agents are liquids which are inert toward the liquid polyisocyanate mixtures (A) which have been modified by means of urethane groups and have boiling points below 80° C., preferably below 50° C., in particular from −50 to 30° C., at atmospheric pressure, so that they evaporate under the influence of the exothermic polyaddition reaction, and mixtures of such physical blowing agents with water. Examples of such preferred liquids are alkanes, for example heptane, hexane, n- and isopentane, preferably technical-grade mixtures of n- and isopentanes, n- and isobutane and propane, cycloalkanes, such as cyclopentane and/or cyclohexane, ethers, for example furan, dimethyl ether and diethyl ether, ketones, for example acetone and methyl ethyl ketone, alkyl carboxylates, such as methyl formate, dimethyl oxalate and ethyl acetate, and halogenated hydrocarbons, such as methylene chloride, dichloromonofluoromethane, difluoromethane, trifluoromethane, difluoroethane, tetrafluoroethane, chlorodifluoroethanes, 1,1-dichloro-2,2,2-trifluoroethane, 2,2-dichloro-2-fluoroethane and heptafluoropropane. It is also possible to use mixtures of these low-boiling liquids with one another and/or with other substituted or unsubstituted hydrocarbons. Also suitable are organic carboxylic acids, for example formic acid, acetic acid, oxalic acid, ricinoleic acid and other carboxyl-containing compounds.

Preferred blowing agents are chlorodifluoromethane, chlorodifluoroethanes, dichlorofluoroethanes, pentane mixtures, cyclopentane, cyclohexane and in particular water, and mixtures of at least two of these blowing agents, for example mixtures of water and cyclopentane and/or cyclohexane, mixtures of chlorodifluoromethane and 1-chloro-2,2-difluoroethane and, if desired, water. The blowing agents used cannot be chlorofluorocarbons, which damage the ozone layer.

The requisite amount of physical blowing agents can be determined experimentally in a simple manner depending on the desired foam density and the amount of water which may have been employed and is from about 0 to 25 parts by weight, preferably from 0 to 15 parts by weight, per 100 parts by weight of the polyhydroxyl compounds (B). It may be expedient to mix the polyisocyanate mixtures (A) containing bonded urethane groups with the inert physical blowing agent and thus to reduce their viscosity.

The catalysts (E) used for the preparation of the CFC-free, highly resilient, flexible PU foams and molded foams are preferably compounds which greatly accelerate the reaction of the hydroxyl-containing compounds of components (B) and, if used, (C) with the liquid, MDI-based polyisocyanate mixtures (A) containing bonded urethane groups. Suitable compounds are organometallic compounds, preferably organotin compounds, such as tin(II) salts of organic carboxylic acids, for example tin(II) acetate, tin(II) octanoate, tin(II) ethylhexanoate and tin(II) laurate, and the dialkyltin(IV) salts of organic carboxylic acids, for example dibutyltin diacetate, dibutyltin dilaurate, dibutyltin maleate and dioctyltin diacetate, and highly basic amines, for example amidines, for example 2,3-dimethyl-3,4,5,6-tetrahydropyrimidine, tertiary amines, for example triethylamine, tributylamine, dimethylbenzylamine, N-methyl-, N-ethyl- and N-cyclohexylmorpholine, N,N,N', N'-tetramethylethylenediamine, N,N,N',N'-tetramethylbutaneamine, N,N,N',N'-tetramethyl-1,6-hexanediamine, di-(4-dimethylaminocyclohexyl)methane, pentamethyldiethylentriamine, tetramethyldi(aminoethyl) ether, bis(dimethylaminopropyl)urea, dimethylpiperazine, 1,2-dimethylimidazole, 1-azabicyclo[3.3.0]octane and preferably 1,4-diazabicyclo[2.2.2]-octane, and alkanolamine compounds, such as triethanolamine, triisopropanolamine, N-methyl- and N-ethyldiethanolamine and dimethylethanolamine.

Other suitable catalysts are: tris(dialkylaminoalkyl)-s-hexahydrotriazines, in particular tris(N,N-dimethylaminopropyl)-s-hexahydrotriazine, tetraalkylammonium hydroxides, such as tetramethylammonium hydroxide, alkali metal hydroxides, such as sodium hydroxide, and alkali metal alkoxides, such as sodium methoxide and potassium isopropoxide, and alkali metal salts of long-chain fatty acids having 10 to 20 carbon atoms and possibly pendant OH groups, and combinations of the organometallic compounds and highly basic amines. The amount of catalyst or catalyst combination is preferably from 0.001 to 5% by weight, in particular from 0.05 to 2% by weight, based on the weight of the polyhydroxyl compound (B).

It is also possible for additives (F) to be incorporated into the reaction mixture for the preparation of the flexible PU (molded) foams. Examples which may be mentioned are surfactants, foam stabilizers, cell regulators, fillers, dyes, pigments, flameproofing agents, and hydrolysis agents, and fungistatic and bacteriostatic substances.

Examples of suitable surfactants are compounds which serve to support homogenization of the starting materials and may also be suitable for regulating cell structure. Examples may be mentioned are emulsifiers, such as the sodium salts of castor oil sulfates, or of fatty acids, and salts of fatty acids with amines, for example diethylamine oleate, diethanolamine stearate, diethanolamine ricinoleate, salts of sulfonic acid, for example alkali metal or ammonium salts of dodecylbenzene- or dinaphthylmethane-disulfonic acid and ricinoleic acid; foam stabilizers, such as siloxane-oxyalkylene copolymers and other organopolysiloxanes, oxyethylated alkylphenols, oxyethylated fatty alcohols, paraffin oils, castor oil and ricinoleic esters, Turkey red oil and groundnut oil, and cell regulators, such as paraffins, fatty alcohols and dimethylpolysiloxanes. Other compounds which are suitable for improving the emulsification action, the cell structure and/or the stabilization of the foam are oligomeric polyacrylates containing polyoxyalkylene and fluoroalkane radicals as side groups. The surfactants are usually used in amounts of from 0.01 to 5 parts by weight, based on 100 parts by weight of the polyhydroxyl compounds (B).

Fillers, in particular reinforcing fillers, are taken to mean the conventional organic and inorganic fillers, reinforcing agents and weighting agents known per se. Specific examples which may be mentioned are: inorganic fillers, for example silicate minerals, for example phyllosilicates, such as antigorite, serpentine, hornblendes, amphiboles, chrysotile, zeolites and talc; metal oxides, for example kaolin, aluminum oxides, aluminum silicate, titanium oxides and iron oxides, metal salts, for example chalk and barytes, inorganic pigments, such as cadmium sulfide and zinc sulfide, and glass particles. Examples of suitable organic fillers are: carbon black, melamine, colophony, cyclopentadienyl resins and graft polymers.

The inorganic and organic fillers can be used individually or as mixtures and are advantageously incorporated into the reaction mixture in amounts of from 0.5 to 50% by weight, preferably from 1 to 40% by weight, based on the weight of components (A) to (C).

Examples of suitable flameproofing agents are tricresyl phosphate, tris(2-chloroethyl) phosphate, tris(2-chloropropyl) phosphate, tris(1,3-dichloropropyl) phosphate, tris(2,3-dibromopropyl) phosphate and tetrakis (2-chloroethyl)ethylene diphosphate.

In addition to the abovementioned halogen-substituted phosphates, it is also possible to use inorganic flameproofing agents, such as red phosphorus, aluminum oxide hydrate, antimony trioxide, arsenic oxide, ammonium sulfate, ammonium polyphosphate, expandable graphite and calcium sulfate, or cyanuric acid derivatives, for example melamine, or mixtures of at least two flameproofing agents, for example ammonium polyphosphates and melamine and/or expandable graphite and, if desired, starch, for flameproofing the flexible PU (molded) foams prepared according to the invention. In general, it has proven expedient to use from 5 to 50 parts by weight, preferably from 5 to 25 parts by weight, of said flameproofing agents or mixtures per 100 parts by weight of components (A) to (C).

Further details on the abovementioned other conventional auxiliaries and additives can be obtained from the specialist literature, for example the monograph by J. H. Saunders and K. C. Frisch, High Polymers, Volume XVI, Polyurethanes, parts 1 and 2, Interscience Publishers, 1962 and 1964 respectively, or the Kunststoff-Handbuch, Polyurethane, Volume VII, Carl-Hanser-Verlag, Munich, Vienna, 1st and 2nd Edition, 1966 and 1983 respectively.

To prepare the flexible PU (molded) foams, the liquid polyisocyanate mixtures (A) containing bonded urethane groups, the relatively high-molecular-weight polyhydroxyl compounds (B) and, if desired, chain extenders and/or crosslinking agents (C) can be reacted in the presence of blowing agents (D), catalysts (E) and, if desired, additives (F) at, for example, from 10 to 100° C., preferably at from 18 to 80° C., in such mixing ratios that expediently from 0.5 to 2, preferably from 0.8 to 1.3, in particular approximately one, reactive hydrogen atom(s) is(are) bonded to formative components (B) and, if used, (C) per NCO group and, if water is used as the blowing agent, the molar ratio between the number of equivalents of water and the number of equivalents of NCO groups is advantageously from 0.5 to 5:1, preferably from 0.7 to 0.95:1, in particular from 0.75 to 0.85:1.

The flexible PU (molded) foams are expediently prepared by the 20 one-shot process by mixing two components, where formative components (B), (D), (E) and, if used, (C) and (F) are combined to form the polyol component, and the polyisocyanate component comprises the polyisocyanate mixture containing bonded urethane groups, if desired mixed with (F) and inert, physical blowing agents. Since the polyol component and the polyisocyanate component have a very good shelf life, they need only be mixed vigorously before preparation of the flexible PU (molded) foams. The reaction mixture can be foamed in open or closed molds; it is furthermore suitable for the preparation of slabstock foams.

In order to prepare flexible PU molded foams, the reaction mixture is introduced, advantageously at from 18 to 80° C., preferably at from 30 to 65° C., into an expediently metallic, heatable mold. The mold temperature is usually from 20 to 90° C., preferably from 35 to 70° C. The reaction mixture can be cured in the closed mold with compaction, for example at a degree of compaction of from 1.1 to 8, preferably from 2 to 6, in particular from 2.2 to 4.

The flexible PU foams usually have free-foamed densities of, for example, from 30 to 60 g/l, preferably from 40 to 55 g/l, in particular from 45 to 52 g/l. Flexible PU foam moldings produced from these foam formulations can have an overall density of from 36 to 55 g/l, preferably from 45 to 50 g/l, depending on the degree of compaction used.

The flexible PU foams produced by the novel process are suitable, for example, as seat cushions for furniture, and the flexible PU molded foams are suitable as cushioning elements, arm rests, head rests, sun visors and safety covers in passenger cabins, preferably in motor vehicles and aircraft.

EXAMPLES

Preparation of polyisocyanate mixtures containing bonded urethane groups

Examples of polyisocyanate mixtures (A) which can be used according to the invention A trifunctional polyoxypropylene-polyol which can be used according to the invention or a mixture of a trifunctional polyoxypropylene-polyol and a trifunctional polyoxypropylene(25% by weight)-polyoxyethylene(75% by weight)-polyol is added with stirring at up to 80° C. to a suitable mixture of diphenylmethane diisocyanates and polyphenyl-polymethylene polyisocyanates (crude MDI mixture E1 to E7). After a post-reaction time of one hour at 80° C., the MDI-based polyisocyanate mixture (A) which has been modified by means of urethane groups is allowed to cool to 23° C.

Comparative Products

The procedure is similar to that for the preparation of the polyisocyanate mixtures (A) which are suitable according to the invention, but polyoxyalkylene-polyols which are suitable according to the invention are not used.

The polyisocyanate mixtures containing bonded urethane groups were prepared using the crude MDI mixtures E1 to E7 shown in Table 1.

| Crude MDI mixture | 4,4'-MDI [% by wt.]* | 2,4'-MDI [% by wt.]* | 2,2'-MDI [% by wt.]* | Higher homologs [% by wt.]* |
| --- | --- | --- | --- | --- |
| E1 | 48.4 | 44.0 | 0.1 | 7.5 |
| E2 | 59.2 | 15.3 | 0.4 | 25.1 |
| E3 | 48.4 | 44.0 | 0.1 | 7.5 |
| E4 | 58.2 | 15.3 | 0.4 | 25.1 |
| E5 | 48.3 | 43.8 | 0.1 | 7.8 |
| E6 | 58.7 | 15.1 | 0.4 | 25.8 |
| E7 | 46.9 | 38.7 | 0.2 | 14.2 |

*based on the total weight of the crude MDI mixture

The crude MDI and polyether-polyols used for the preparation of the polyisocyanate mixtures containing bonded urethane groups, the amounts employed and the isocyanate content of the resultant polyisocyanate mixture (A) which can be used according to the invention and of the comparative products are shown in Table 2, where

| | |
|---|---|
| TMP-PO | denotes trimethylolpropane-initiated polyoxypropylene-polyol, |
| Gly-PO | denotes glycerol-initiated polyoxypropylene-polyol, |
| Gly-PO/EO | denotes glycerol-initiated polyoxypropylene (25% by weight)-polyoxyethylene (75% by weight)-polyol, |
| Gly-EO | denotes glycerol-initiated polyoxyethylene-polyol, and |
| III-PO | denotes 1,3-propanediol-initiated polyoxypropylene-glycol. |

0.1 part by weight of a silicone-based foam stabilizer (Tegostab ® B 8680 from Goldschmidt, Essen).

Component B:

polyisocyanate mixtures (A) containing urethane groups and modified according to the invention, as under product numbers Mod. 1 to 7 and comparative products VB1 to VB6.

To prepare the flexible PU molded foams, 100 parts by weight of component A were mixed vigorously with component B in an amount corresponding to the isocyanate index 80 or 100 at 23° C, with the aid of a stirrer, the reaction

TABLE 2

| | Crude MDI mixture | | Polyether-polyols | | | Polyisocyanate mixture containing urethane groups |
|---|---|---|---|---|---|---|
| | Type | Amount [parts by wt.] | Type | Amount [parts by wt.] | OH number [mg of KOH] | Isocyanate content [% by wt.] |
| Product No. according to the invention | | | | | | |
| Mod 1 | E1 | 85.3 | TMP-PO | 14.7 | 28.0 | 27.8 |
| Mod 2 | E2 | 86.9 | TMP-PO | 13.1 | 28.0 | 28.0 |
| Mod 3 | E3 | 85.3 | Gly-PO | 14.7 | 28.0 | 27.6 |
| Mod 4 | E4 | 79.5 | Gly-PO | 20.5 | 27.7 | 27.7 |
| Mod 5 | E5 | 85.7 | Gly-PO | 14.3 | 42.0 | 27.7 |
| Mod 6 | E6 | 82.4 | Gly-PO | 17.6 | 42.0 | 26.3 |
| Mod 7 | E7 | 85 | Mixture of Gly-PO and Gly-PO/EO in a weight ratio of 50:50 | 15 | 42.0 | 27.4 |
| Comparative products | | | | | | |
| VB1 | E6 | 87.9 | Gly-PO | 12.1 | 328.0 | 28.6 |
| VB2 | E6 | 85.9 | Gly-PO | 14.1 | 70.0 | 27.8 |
| VB3 | E6 | 87.4 | TMP-PO | 12.6 | 66.2 | 27.7 |
| VB4 | E6 | 87.5 | Gly-EO | 12.5 | 70.0 | 27.4 |
| VB5 | E6 | 87.5 | III-PO | 12.5 | 25.2 | 27.6 |
| VB6 | E6 | 87.5 | III-PO | 12.5 | 56.0 | 27.6 |

Preparation of Flexible PU Foams

Examples 1 to 14 and Comparative Examples I to XI

Component A: a mixture comprising 93.08 parts by weight of a glycerol-initiated polyoxypropylene (86.2% by weight)-polyoxyethylen (13.8% by weight)-polyol having a hydroxyl number of 28, corresponding to a molecular weight of approximately 6000,
2.5 parts by weight of a glycerol-initiated polyoxypropylene (25% by weight)-polyoxyethylene (75% by weight)-polyol having a hydroxyl number of 42, corresponding to a molecular weight of approximately 4000,
3.30 parts by weight of water,
0.45 part by weight of a 33% strength by weight solution of triethylenediamine in dipropylene glycol,
0.12 part by weight of a 70% strength by weight solution of bis(N,N-dimethylaminoethyl) ether in dipropylene glycol,
0.45 part by weight of 2-(2-dimethylaminoethyoxy)ethanol and mixture was introduced into a metallic mold with the internal dimensions 40×40×10 cm held at 45° C. and allowed to expand and react to completion in the closed mold. The resultant molding was demolded after 5 minutes.

The polyisocyanate mixture containing urethane groups used for the preparation of the flexible PU molded foam and the properties measured on the molding obtained are shown in Table 3 (examples) and Table 4 (comparative examples).

The flexible PU molded foams (examples, Table 3) prepared by the novel process have better mechanical properties, in particular better resilience, expressed by the results of the ball rebound test as described in ASTM D-3574-86 than known flexible molded foams (comparative examples, Table 4).

TABLE 3

Examples 1 to 14
Mechanical properties of the flexible PU molded foam

| Example | Polyisocyanate mixture containing urethane groups | Isocyanate index | Density [g/l] DIN 53420 | Tensile strength [kPa] DIN 53571 | Elongation [%] DIN 53571 | CS [%] DIN 53572 | Compressive strength (40%) [kPa] DIN 53577 | Resilience ASTM D-3574-86 | TPS [N/mm] DIN 53575 |
|---|---|---|---|---|---|---|---|---|---|
| 1 | Mod. 1 | 80 | 47.0 | 106 | 190 | 14.1 | 2.3 | 42.7 | 0.54 |
| 2 | Mod. 2 | 80 | 51.3 | 68 | 102 | 4.5 | 3.4 | 51.8 | 0.27 |
| 3 | Mod. 3 | 80 | 46.3 | 104 | 182 | 4.7 | 2.3 | 44.7 | 0.56 |
| 4 | Mod. 4 | 80 | 48.8 | 61 | 98 | 6.4 | 2.9 | 50.1 | 0.26 |
| 5 | Mod. 5 | 80 | 45.7 | 96 | 180 | 7.4 | 2.2 | 50.9 | 0.49 |
| 6 | Mod. 6 | 80 | 51.1 | 57 | 100 | 5.7 | 2.6 | 51.0 | 0.28 |
| 7 | Mod. 7 | 80 | 51.4 | 135 | 143 | 9.9 | 3.0 | 51.1 | 0.30 |
| 8 | Mod. 1 | 100 | 47.8 | 117 | 140 | 6.6 | 4.6 | 54.0 | 0.51 |
| 9 | Mod. 2 | 100 | 48.7 | 100 | 89 | 4.8 | 5.9 | 54.1 | 0.38 |
| 10 | Mod. 3 | 100 | 47.9 | 121 | 138 | 3.6 | 4.8 | 52.8 | 0.50 |
| 11 | Mod. 4 | 100 | 48.6 | 98 | 89 | 5.8 | 5.6 | 53.0 | 0.37 |
| 12 | Mod. 5 | 100 | 46.4 | 107 | 134 | 3.5 | 4.3 | 51.7 | 0.52 |
| 13 | Mod. 6 | 100 | 44.7 | 87 | 90 | 5.2 | 4.7 | 52.6 | 0.39 |
| 14 | Mod. 7 | 100 | 53.0 | 161 | 103 | 6.0 | 5.9 | 51.6 | 0.37 |

CS = compression set
TPS = tear propagation strength

TABLE 4

Comparative Examples I to XI
Mechanical properties of the flexible PU molded foam

| Comparative-example | Polyisocyanate mixture containing urethane groups | Isocyanate index | Density [g/l] DIN 53420 | Tensile strength [kPa] DIN 53571 | Elongation [%] DIN 53571 | CS [%] DIN 53572 | Compressive strength (40%) [kPa] DIN 53577 | Resilience ASTM D-3574-86 | TPS [N/mm] DIN 53575 |
|---|---|---|---|---|---|---|---|---|---|
| I | VB1 | 80 | 44.5 | 91 | 102 | 16.2 | 3.6 | 44.5 | 0.36 |
| II | VB2 | 80 | 50.6 | 73 | 99 | 5.6 | 3.1 | 45.4 | 0.30 |
| III | VB3 | 80 | 49.6 | 75 | 99 | 5.2 | 3.3 | 46.2 | 0.31 |
| IV | VB4 | 80 | 45.9 | 47 | 76 | 6.1 | 2.7 | 41.4 | 0.25 |
| V | VB5 | 80 | 47.8 | 87 | 114 | 7.9 | 3.3 | 42.4 | 0.30 |
| VI | VB6 | 80 | 47.4 | 70 | 101 | 2.85 | 3.3 | 45.7 | 0.31 |
| VII | VB2 | 100 | 48.0 | 115 | 90 | 5.0 | 5.0 | 47 | 0.45 |
| VIII | VB3 | 100 | 48.5 | 104 | 88 | 5.1 | 6.2 | 50 | 0.38 |
| IX | VB4 | 100 | 48.1 | 77 | 66 | 3.7 | 5.5 | 43 | 0.27 |
| X | VB5 | 100 | 49.6 | 128 | 96 | 6.8 | 8.7 | 45 | 0.28 |
| XI | VB6 | 100 | 48.8 | 114 | 93 | 2.7 | 6.6 | 44 | 0.31 |

CS = compression set
TPS = tear propagation strength

Testing of the sitting comfort of the flexible PU molded foams

The sitting comfort of the flexible PU molded foams was determined with the aid of the following measurement method:

A 16 l test cushion is subjected to a constant force of 750 N by means of a test ram (corresponding to DIN 53 574), this force being intended to represent the constant load due to the weight of a person sitting on the cushion. In addition, a small sinusoidal force with an amplitude of 50 N and a frequency of 5 Hz is superimposed on this force, this being intended to represent additional small forces. The amplitude of the sinusoidal deformation caused by this is measured. The ratio between force and amplitude for this additional vibration may be regarded as a local modulus of elasticity and is a measure of the hardness actually perceived under load in the case of small impacts. The sitting comfort is therefore greater the smaller this local modulus of elasticity and thus the softer the seat appears.

The graphs below show a conventional flexible molded foam (A) and a flexible PU molded foam prepared according to the invention, which has a lower local modulus of elasticity for comparable density (48 and 50 g/l) and the same compressive strength and constant load and therefore appears softer and more comfortable than he conventional flexible molded foam (A).

We claim:

1. A process for preparing a liquid, diphenylmethane diisocyanate-based polyisocyanate composition, said process comprising
   a) providing a mixture (a) of diphenylmethane diisocyanates and polyphenylpolymethylene polyisocyanates having a content of diphenylmethane diisocyanate isomers of from 55 to 99% by weight based on the total weight of said mixture (a),
   b) reacting said mixture (a) with at least one polyol (b) selected from the group consisting of trifunctional polyoxypropylene polyols having hydroxyl numbers of from 20 to 60 in an amount sufficient to produce polyisocyanate prepolymers, wherein said polyisocyanate prepolymers contain bonded urethane groups and have a content of NCO groups of from 22 to 30% by weight.

2. A process as recited in claim 1, wherein said mixture (a) comprises, based on the total weight of said mixture (a):

a1) from 45 to 65% by weight of 4,4'-diphenylmethane diisocyanate, a2) from 10 to 50% by weight of 2,4'-diphenylmethane diisocyanate, a3) from 0 to 1% by weight of 2,2'diphenylmethane diisocyanate and a4) from 45 to 1% by weight of an at least trifunctional polyphenylpolymethylene polyisocyanate.

3. A process as recited in claim 1, wherein the composition comprises from 76 to 95.5% by weight of said mixture (a), said mixture (a) comprising:

a1) from 45 to 65% by weight of 4,4'-diphenylmethane diisocyanate, a2) from 10 to 50% by weight of 2,4'-diphenylmethane diisocyanate, a3) from 0 to 1% by weight of 2,2'-diphenylmethane diisocyanate, and a4) from 45 to 1% by weight of at least trifunctional polyphenylpolymethylene polyisocyanate;

and from 24 to 4.5% by weight of said at least one polyol (b).

4. A process for preparing a liquid, diphenylmethane diisocyanate-based polyisocyanate composition, said process comprising providing a mixture (a) of diphenylmethane diisocyanates and polyphenylpolymethylene polyisocyanates having a content of diphenylmethane diisocyanate isomers of from 55 to 99% by weight based on the total weight of said mixture (a), reacting said mixture (a) with a polyol (b) consisting essentially of a trifunctional polyoxypropylene polyol having a hydroxyl number of from 20 to 60 in an amount sufficient to produce polyisocyanate prepolymers, wherein said polyisocyanate prepolymers contain bonded urethane groups and have a content of NCO groups of from 22 to 30% by weight.

5. A process as recited in claim 4, wherein said mixture (a) comprises, based on the total weight of said mixture (a):

a1) from 45 to 65% by weight of 4,4'-diphenylmethane diisocyanate, a2) from 10 to 50% by weight of 2,4'-diphenylmethane diisocyanate, a3) from 0 to 1% by weight of 2,2'diphenylmethane diisocyanate and a4) from 45 to 1% by weight of an at least trifunctional polyphenylpolymethylene polyisocyanate.

6. A process as recited in claim 4, wherein the composition comprises from 76 to 95.5% by weight of said mixture (a), said mixture (a) comprising:

a1) from 45 to 65% by weight of 4,4'-diphenylmethane diisocyanate, a2) from 10 to 50% by weight of 2,4'-diphenylmethane diisocyanate, a3) from 0 to 1% by weight of 2,2'-diphenylmethane diisocyanate, and a4) from 45 to 1% by weight of at least trifunctional polyphenylpolymethylene polyisocyanate;

and from 24 to 4.5% by weight of said at said polyol (b).

7. A process for preparing a liquid, diphenylmethane diisocyanate-based polyisocyanate composition, said process consisting essentially of the steps of:

providing a mixture (a) of diphenylmethane diisocyanates and polyphenylpolymethylene polyisocyanates having a content of diphenylmethane diisocyanate isomers of from 55 to 99% by weight based on the total weight of said mixture (a), and reacting said mixture (a) with a polyol (b) consisting essentially of a trifunctional polyoxypropylene polyol having a hydroxyl number of from 20 to 60 in an amount sufficient to produce polyisocyanate prepolymers, wherein said polyisocyanate prepolymers contain bonded urethane groups and have a content of NCO groups of from 22 to 30% by weight.

8. A process as recited in claim 7, wherein said mixture (a) comprises, based on the total weight of said mixture (a):

a1) from 45 to 65% by weight of 4,4'-diphenylmethane diisocyanate, a2) from 10 to 50% by weight of 2,4'-diphenylmethane diisocyanate, a3) from 0 to 1% by weight of 2,2'diphenylmethane diisocyanate and a4) from 45 to 1% by weight of an at least trifunctional polyphenylpolymethylene polyisocyanate.

9. A process as recited in claim 7, wherein the composition comprises from 76 to 95.5% by weight of said mixture (a), said mixture (a) comprising:

a1) from 45 to 65% by weight of 4,4'-diphenylmethane diisocyanate, a2) from 10 to 50% by weight of 2,4'-diphenylmethane diisocyanate, a3) from 0 to 1% by weight of 2,2'-diphenylmethane diisocyanate, and a4) from 45 to 1% by weight of at least trifunctional polyphenylpolymethylene polyisocyanate;

and from 24 to 4.5% by weight of said trifunctional polyoxypropylene-polyol.

* * * * *